United States Patent
Seyedi

(10) Patent No.: US 11,619,784 B2
(45) Date of Patent: Apr. 4, 2023

(54) OPTICAL DEVICE HAVING PHOTONIC-CRYSTAL LATTICE STRUCTURE FOR OPTICAL INTERCONNECTS

(71) Applicant: Hewlett Packard Enterprise Development LP, Houston, TX (US)

(72) Inventor: Mir Ashkan Seyedi, Mountain View, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/443,989

(22) Filed: Jul. 29, 2021

(65) Prior Publication Data
US 2023/0033730 A1 Feb. 2, 2023

(51) Int. Cl.
*G02B 6/293* (2006.01)
*G02B 6/122* (2006.01)

(52) U.S. Cl.
CPC ....... *G02B 6/29395* (2013.01); *G02B 6/1225* (2013.01); *G02B 6/29335* (2013.01)

(58) Field of Classification Search
None
See application file for complete search history.

(56) References Cited

U.S. PATENT DOCUMENTS

| | | | |
|---|---|---|---|
| 7,257,333 B2 * | 8/2007 | Rosenwald | B82Y 20/00 398/201 |
| 7,269,310 B2 * | 9/2007 | Suzuki | G02B 6/1225 385/129 |
| 8,642,941 B2 | 2/2014 | Vermeulen et al. | |
| 9,322,999 B2 * | 4/2016 | Krauss | B82Y 20/00 |
| 9,748,736 B1 | 8/2017 | Ma et al. | |
| 9,829,629 B2 | 11/2017 | Horth et al. | |
| 9,986,217 B2 | 5/2018 | Ellwood, Jr. | |
| 10,009,668 B2 | 6/2018 | Liboiron-Ladouceur et al. | |
| 2003/0185532 A1 * | 10/2003 | Hosomi | G02B 6/1225 385/125 |
| 2005/0265660 A1 * | 12/2005 | Miller | B82Y 20/00 385/39 |
| 2009/0087137 A1 | 4/2009 | Doan | |
| 2016/0012176 A1 | 1/2016 | Liu et al. | |
| 2017/0207600 A1 | 7/2017 | Klamkin et al. | |
| 2018/0267339 A1 | 9/2018 | Liu et al. | |

FOREIGN PATENT DOCUMENTS

WO  WO-2017049276  3/2017

* cited by examiner

*Primary Examiner* — Omar R Rojas
(74) *Attorney, Agent, or Firm* — Sheppard Mullin Richter & Hampton LLP

(57) ABSTRACT

Examples described herein relate to an optical device having a photonic-crystal lattice structure. In some examples, the optical device may include a substrate having a photonic-crystal lattice structure. The optical device may further include an optical waveguide formed in the photonic-crystal lattice structure and a defect cavity formed in the photonic-crystal lattice structure and optically coupled to the optical waveguide. Furthermore, the optical device may include a refractive index tuning structure adjacent to the defect cavity in the photonic-crystal lattice structure.

19 Claims, 3 Drawing Sheets

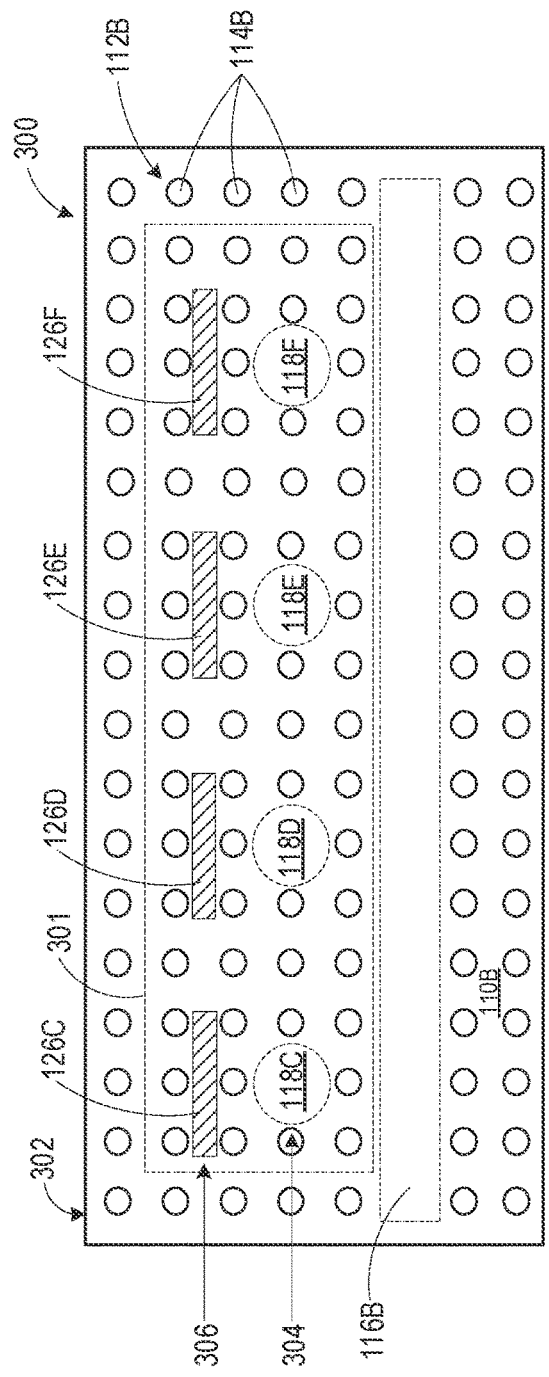
FIG. 3
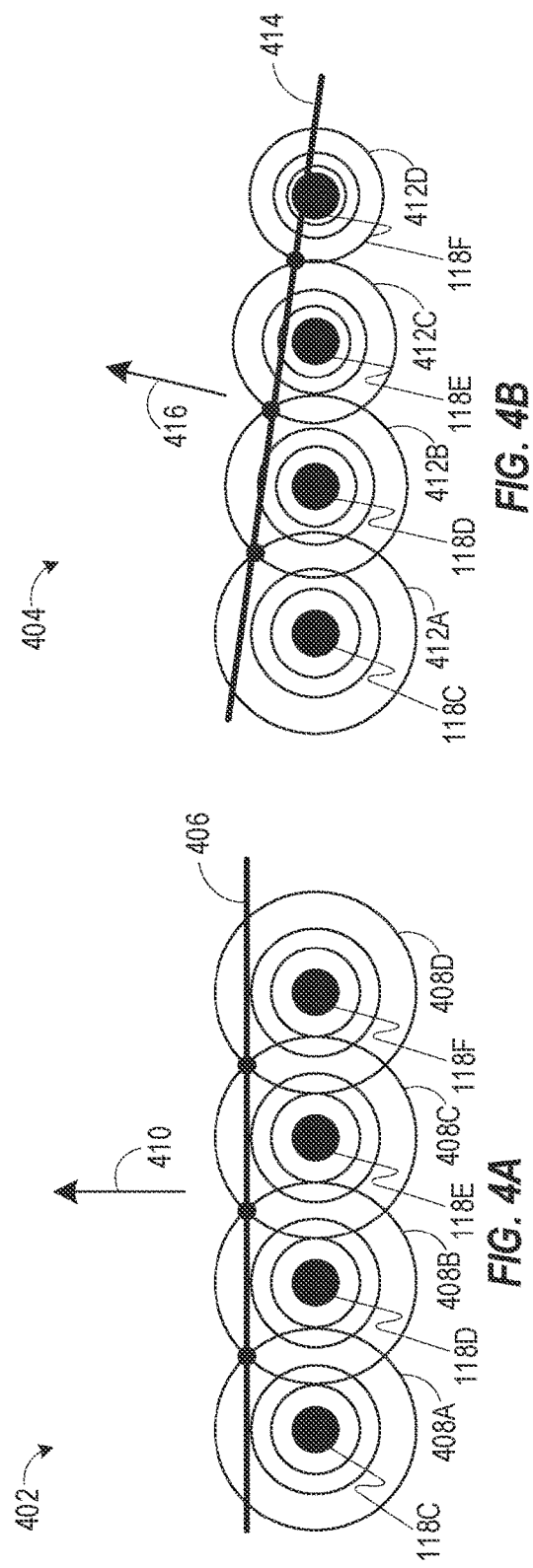
FIG. 4A
FIG. 4B

OPTICAL DEVICE HAVING PHOTONIC-CRYSTAL LATTICE STRUCTURE FOR OPTICAL INTERCONNECTS

BACKGROUND

Optical devices include optical components that generate, process, and/or carry optical signals from one point to another point. In some optical systems, optical signals may be transmitted from one optical device to another optical device via optical interconnects. Any manufacturing imperfections or misalignments of the optical interconnects may lead to losses of the optical signals.

BRIEF DESCRIPTION OF THE DRAWINGS

Various examples will be described below with references to the following figures.

FIG. 3 depicts a top view of yet another example optical device.

FIGS. 4A and 4B depict example light emission patterns via defect cavities of the example optical device of FIG. 3.

Figure 1B:
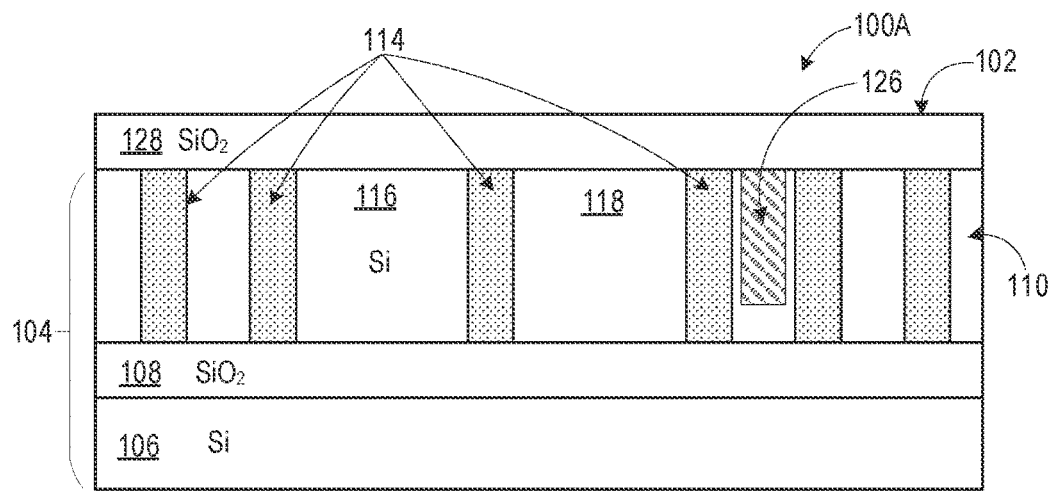
FIG. 1B depicts a top view of the example optical device of FIG. 1.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Optical devices and or systems may include various optical components such as, but not limited to, light sources (e.g., lasers), optical modulators, optical filters, optical amplifiers, optical couplers, coupling waveguides (e.g., fiber optic cables), optical combiners, optical multiplexers, optical demultiplexers, optical resonators, photodetectors (e.g., photodiodes), or the like. Optical devices may be implemented on an integrated circuit chip. Typically, in multi-chip optical modules and/or systems, an optical chip may transmit light to another optical chip via optical interconnects. For silicon photonics interconnect solutions, it is often useful to have an emission of the light that is orthogonal to a surface of an optical chip, also referred to as a normal direction emission.

A common technique used to transmit the light from one optical chip to another optical chip may entail the use of grating couplers. Optical couplers, such a Bragg grating-based couplers, often achieve near-normal direction of emission, for example, with an error of about 6 to 10 degrees from the normal direction emission. Further, in certain cases, such errors may exaggerate coupling losses if optical interconnects are misaligned. This may increase the mechanical engineering complexity of optical interconnects to achieve low-loss coupling. For example, 1 dB or less per facet for fiber to chip connector solutions is a common low-loss coupling target. Manufacturing interconnect solutions with the precise alignments needed to provide such low tolerance may not be cost-effective. Furthermore, an angle of emission of the light from an optical interconnect depends on the wavelength of the light, and thus it may be difficult to design an interconnect solution that is low-loss for a wide spectrum of wavelengths.

Further, photonic-crystal lattice devices provide optical emission centers that are tightly confined in their physical footprint. In accordance with the examples presented herein, a photonic-crystal lattice structure is used to implement an optical phased array for chip-to-fiber coupling applications. The solution relates to a device that can achieve normal to near-normal direction emission which can also be tuned for the desired operating wavelength. In some examples, this may be achieved by using tightly-confined optical emission centers much like a phased array and by integrating electro-optical devices to tune the relative phase between the emissions centers. In this way, the optical device can be tuned in real-time for its desired angle of emission and operating wavelength.

In the photonic-crystal lattice structure formed in a substrate, a waveguide structure may be created by selectively removing holes (i.e., not etching them). Similarly, by removing a hole, an optical cavity can also be created, referred to as a defect cavity, adjacent to the waveguide structure. In particular, the defect cavity may refer to a region of the photonic-crystal structure where there is no hole etched and silicon material remains. Due to evanescent coupling, light propagating in the optical waveguide may couple and resonate inside the defect cavity. The resonant wavelength of each defect cavity may be a function of its physical parameters (e.g., the diameter of the hole) and lattice design. Careful design of the defect cavity may enable normal to near-normal emission of the light. Further, in some examples, the optical device may include an on-chip resistor or diode. The on-chip resistor or diode may locally heat the material of the defect cavity, changing the local index of refraction and thus phase seen by the optical mode as it couples from the optical waveguide to the defect cavity. In this way, the use of the on-chip resistor or diode can dynamically control the relative difference between the emission centers to enable the desired beam-steering.

In some examples, an optical device including a substrate having a photonic-crystal lattice structure is presented. The optical device may include an optical waveguide formed in the photonic-crystal lattice structure. Further, the optical device may include a defect cavity formed in the photonic-crystal lattice structure and optically coupled to the optical waveguide. Furthermore, the optical device may include a refractive index tuning structure adjacent to the defect cavity in the photonic-crystal lattice structure. During operation, a light having a wavelength equal to a resonant wavelength of the defect cavity may be evanescently coupled into the defect cavity from the optical waveguide. The refractive index tuning structure may tune the refractive index of material near the defect cavity and thus the phase seen by the optical mode as it couples from the waveguide to the defect cavity. Consequently, an angle of emission of the light from the defect cavity may be tuned.

The optical device may have a small footprint. In an example photonic-crystal lattice structure, an intra-hole spacing for operation at a wavelength of 1310 nanometers (nm) may be on the order of 500 nm. Therefore, several emission centers (i.e., defect cavities) may be created within a 10 micrometers (μm) diameter circle, which is equal to a typical mode-field diameter of a single-mode fiber optic cable. Furthermore, the dynamic phase control can ameliorate the manufacturing variation seen by traditional grating couplers and connector solutions to optimize coupling for a desired operating wavelength or create a broadband coupling solution for many operating wavelengths across a wide spectral range.

Figure 1A:
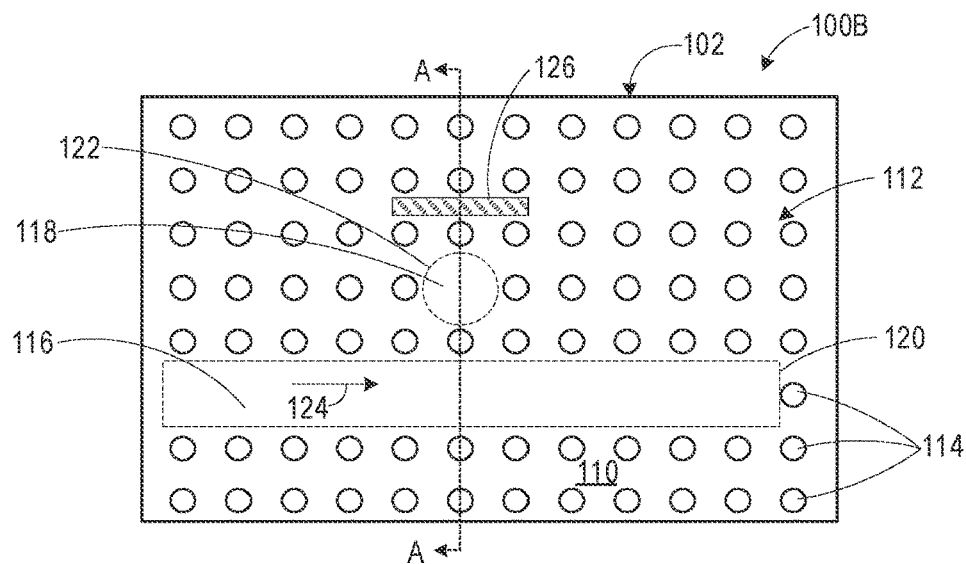
FIG. 1A depicts a cross-sectional view of an example optical device.

Referring now to the drawings, FIGS. 1A and 1B respectively depict a cross-sectional view 100A and a top view 100B of an example optical device 102. The optical device 102 may be capable of generating, processing, and/or allowing passage of an optical signal (i.e., light). The cross-sectional view 100A represents a cross-section of the optical device 102 taken at a location A-A marked in the top view 100B. For clarity of representation, certain layers (in particular a cladding layer, described later) of the optical device 102 are not shown in the top view 100B of FIG. 1B.

Figure 2:
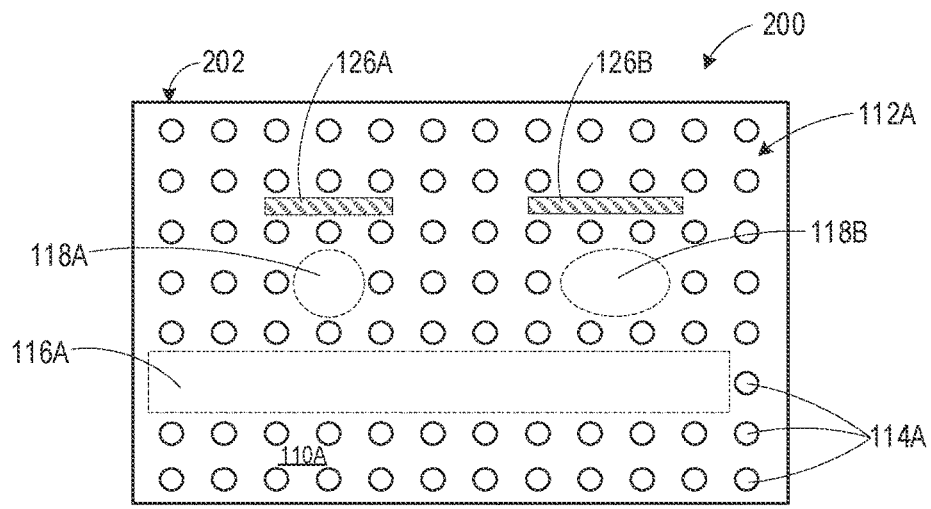
FIG. 2 depicts a top view of another example optical device.

The optical device 102 may include a substrate 104 formed of semiconductor material. In some examples, the substrate 104 may be a multi-layered substrate including a base substrate layer 106, a base oxide layer 108, and a device layer 110. The base substrate layer 106 may be formed of semiconductor material, for example, silicon (Si). Other examples of materials that may be used to form the base substrate layer 106 may include, but are not limited to, indium phosphide (InP), germanium (Ge), gallium arsenide (GaAs), aluminum gallium arsenide (AlGaAs), indium gallium arsenide (InGaAs), indium arsenide (InAs), or combinations thereof. The base oxide layer 108 may be grown and/or deposited over the base substrate layer 106. The base oxide layer 108 may be formed by oxidizing the substrate 104, in some examples. In the implementation of FIG. 2, for the base substrate layer 106 made of silicon, the base oxide layer 108 may be silicon dioxide ($SiO_2$) that may be formed in the presence of oxygen at a temperature in the range from 900° C. to 1380° C. In some examples, the base oxide layer 108 may be a buried oxide (BOX) layer that is the $SiO_2$ may be buried in the base substrate layer 106. In some examples, a layer of the $SiO_2$ may be buried in the base substrate layer 106 at a depth ranging from less than 100 nm to several micrometers from the wafer surface depending on the application. Other example materials of the base oxide layer 108 may include, but are not limited to, silicon nitride ($Si_3N_4$), aluminum oxide ($Al_2O_3$), hafnium dioxide ($HfO_2$), polyimide, benzocyclobutene (BCB), or combinations thereof.

The device layer 110 may be formed on top of the base oxide layer 108. Other examples of the materials used to form the device layer 110 may include, but are not limited to, InP, Ge, GaAs, AlGaAs, InGaAs, InAs, or combinations thereof. The device layer 110 may be suitably shaped (e.g., via techniques such as photolithography and etching) to form a photonic-crystal lattice structure 112. The photonic-crystal lattice structure 112 may include a predefined pattern of holes etched into the substrate 104. In particular, the photonic-crystal lattice structure 112 may be formed by selectively etching holes 114 at a plurality of lattice sites into the substrate 104, more particularly, into the device layer 110. The holes 114 may be formed in a predetermined pattern forming a lattice structure. In the example of FIG. 1B, the holes 114 are arranged in a square-shaped pattern which is also referred to as a square lattice (i.e., lines joining centers of the holes form square shapes). In some other examples, the holes 114 may be arranged in lattices of other shapes, such as, but not limited to triangular lattice, polygonal (e.g., pentagonal, hexagonal) lattice, a diamond-shaped lattice, and the like, without limiting the scope of the present disclosure. The holes may be empty (e.g., filled with air) or filled with a filler material different from the material of the device layer such that the refractive index of the holes 114 is different from the refractive index of the material of the device layer 110. Examples of the filler material may include, but are not limited to, water or polymer PMMA (polythylmethacrylate). Also, dimensions (e.g., diameter) of the holes 114 may be suitably controlled during the formation of the photonic-crystal lattice structure 112.

Further, in some examples, the optical device 102 may include an optical waveguide 116 and a defect cavity 118 in the photonic-crystal lattice structure 112. For illustration purposes, in the photonic-crystal lattice structure 112 shown in FIGS. 1A-1B, a single optical waveguide 116, and a single defect cavity 118 are depicted in FIGS. 1A-1B. In some other examples, the use of more than one optical waveguide and more than one defect cavity is also envisioned within the purview of the present disclosure. The optical waveguide 116 may be formed at the time of forming the photonic-crystal lattice structure 112 in the device layer 110, in particular, by avoiding formation of a plurality of holes at a set of serially arranged lattice sites. For example, a region 120 encompassing the set of serially arranged lattice sites may be photolithographically defined and masked. The optical waveguide 116 may be formed by not etching a series of holes in the region 120. Accordingly, in the region 120, the material of the device layer 110 remains without holes the region 120 which may act as the optical waveguide 116.

The defect cavity 118 may be a region (e.g., a region 122) of the substrate 104 that does not include the predefined pattern of holes. In particular, the region 122, the material of the device layer 110 remains without any hole and acts as the defect cavity 118. The defect cavity 18 may be formed adjacent to the optical waveguide 116 in the photonic-crystal lattice structure 112 at the time of forming the photonic-crystal lattice structure 112 in the device layer 110, in particular, by not forming a hole in the region 122. For example, the region 122 may be photolithographically defined and masked to prevent the formation of a hole therein, The defect cavity 118 is oriented at an angle to a direction 124 of the propagation of the light via the optical waveguide 116. In particular, in some examples, the defect cavity and the optical waveguide 116 are orthogonal to each other. The defect cavity 118 may have a resonant wavelength at which an optical signal can resonate inside the defect cavity 118. The defect cavity 118 of a given resonant wavelength may be formed by engineering bandgap of the material of the device layer 110. In some examples, parameters such as one or more of the dimensions (e.g., the diameter) of the defect cavity 118, a hole period or a lattice constant of the photonic-crystal lattice structure 112 (i.e., property based on a center to center distance between adjacent holes), a size (e.g., the diameter) of the holes 114, a lattice pattern (e.g., a pattern of the holes), a tapering pattern of the holes 114, may be suitably controlled to achieve the given resonant wavelength.

During operation of the optical device 102, light may propagate through the optical waveguide 116 in an example direction 124. At least some portion of the light propagating through the optical waveguide 116 may be evanescently coupled into the defect cavity 118. In particular, a light having a wavelength equal to the resonant wavelength of the defect cavity 118 may be evanescently coupled into the defect cavity 118 from the optical waveguide 116. The defect cavity 118 may act as an emission center through which the light may be extracted and can be transmitted outside of the optical device 102. The optical device 102 may have a small footprint as it uses the photonic-crystal lattice structure 112. In the photonic-crystal lattice structure 112, an intra-hole spacing (e.g., spacing between two adjacent holes 114) for operation at a wavelength of 1310 nm may be on the order of 500 nm. Therefore, several emission centers (i.e., defect cavities) may be created in an area of about 10 µm diameter circle.

Furthermore, in some examples, the optical device 102 includes a refractive index tuning structure 126 adjacent to the defect cavity 118 in the photonic-crystal lattice structure 112. In one example, the refractive index tuning structure 126 may be a resistive heater. The refractive index tuning structure 126 that is implemented as the resistive heater may locally heat the defect cavity 118 to alter the refractive index of the defect cavity to vary an angle of the light emitting from the defect cavity 118. The resistive heater may be formed by doping a region defined for the refractive index tuning structure 126 with p-type doping or n-type doping. In another example, the refractive index tuning structure 126 may be implemented as a diode which may be formed by doping the region defined for the refractive index tuning structure 126 with the p-type doping or the n-type doping.

During operation, the refractive index tuning structure 126 may be supplied with an electrical signal (e.g., electrical voltage or electrical current) via one or more metal contacts (not shown). On application of the electrical signal to the refractive index tuning structure 126, charge carriers may accumulate or deplete at a PN junction formed in the refractive index tuning structure 126. Such changes (e.g., accumulation or depletion) in the charge carrier concentration at the PN junction may cause variations in the refractive index of the defect cavity 118. The changes in the refractive index of the defect cavity 118 may affect an angle of emission of the light from the defect cavity 118. In some examples, electrical current and/or voltage applied to the refractive index tuning structure 126 may be controlled to dynamically vary a phase the light coupled into the defect cavity 118. Accordingly, predetermined variations in the angle of emission of the light from the defect cavity 118 may be achieved. Such dynamic phase control can ameliorate the manufacturing variations in optical couplers and connector solutions to optimize coupling for a given operating wavelength or create a broadband coupling solution for many operating wavelengths across a wide spectral range (see FIG. 2).

Further, in some examples, as depicted in FIG. 1A, the optical device may include a cladding layer 128 disposed on top of the device layer 110. In particular, the cladding layer 128 may have a different refractive index than that of the device layer 110. In certain examples, the cladding layer 128 may have the same refractive index as the base oxide layer 108. Examples of the materials that may be used to form the cladding layer 128 may include, but are not limited to, $SiO_2$, $Si_3N_4$, $Al_2O_3$, $HfO_2$, polyimide, BCB, or combinations thereof. The cladding layer 128 may be formed via techniques, such as, but not limited to, thermal growth or deposition.

FIG. 2 depicts a top view 200 of an example optical device 202. The optical device 202 of FIG. 2 may be representative of one example of the optical device 102 of FIG. 1, and may include one or more structural elements similar, in one or more aspects, to those described in FIG. 1—description of which is not repeated herein for the sake of brevity. For example, in FIG. 2, the optical device 202 is shown to include a device layer 110A, the photonic-crystal structure 112A, holes 114A, an optical waveguide 116A, a plurality of defect cavities 118A and 118B, and a plurality of refractive index tuning structures 126A, 126B.

The defect cavities 118A and 118B are formed adjacent to the optical waveguide 116A such that at least some of the light propagating in the optical waveguide 116A may be evanescently coupled into the defect cavities 118A and 118B. The defect cavities 118A and 118B may be example representatives of the defect cavity 118 described in FIG. 1. In the optical device 202 of FIG. 2, the defect cavities 118A and 118B may be designed to have different resonant wavelengths from each other. In the non-limiting example of FIG. 2, the defect cavities 118A and 118B may be designed to have different dimensions to achieve different resonant wavelengths—a first resonant wavelength ($\lambda_1$) and a second resonant wavelength ($\lambda_2$), respectively. Further, the refractive index tuning structures 126A and 126B are formed respectively adjacent to the defect cavities 118A and 118B. The refractive index tuning structures 126A and 126B may be example representatives of the refractive index tuning structure 126 described in FIG. 1.

During the operation of the optical device 202, from the light propagating inside the optical waveguide 116A, a first optical signal having a wavelength equal to the first resonant wavelength ($\lambda_1$) may be evanescently coupled into the defect cavity 118A and a second optical signal having a wavelength equal to the second resonant wavelength ($\lambda_2$) may be evanescently coupled into the defect cavity 118B. Further, the angles of emissions of the first optical signal and the second optical signal may be independently tuned by controlling electrical signals applied to the refractive index tuning structures 126A and 126B. The application of the electrical signals to the refractive index tuning structures 126A and 126B may cause a change in the refractive index of the defect cavities 118A and 118B, respectively, which results in a modification of the angle of emission of the light from the defect cavities 118A and 118B.

Turning now to FIG. 3, a top view 300 of an example optical device 302 is depicted. The optical device 302 of FIG. 3 may be representative of one example of the optical device 102 of FIG. 1 and may include one or more structural elements similar, in one or more aspects, to those described in FIG. 1—description of which is not repeated herein for the sake of brevity. For example, in FIG. 3, the optical device 202 is shown to include a device layer 110B, the photonic-crystal structure 112B, holes 114B, an optical waveguide 116B, a plurality of defect cavities 118C, 118D, 118E, and 118F (collectively referred to as defect cavities 118C-118F), and a plurality of refractive index tuning structures 126C, 126D, 126E, and 126F (collectively referred to as refractive index tuning structures 126C-126F).

The optical device 302, may include an optical interconnect 301 adjacent to the optical waveguide 116. The optical interconnect 301 may include an array 304 of the defect cavities 118C-118F formed adjacent to the optical waveguide 116B such that at least some of the light propagating in the optical waveguide 116 may be evanescently coupled into the defect cavities 118C-118F. The defect cavities 118C-118F may be example representatives of the defect cavity 118 described in FIG. 1. The defect cavities 118C-118F may be designed to have the same resonant wavelengths. Having a plurality of defect cavities 118C-118F of the same resonant wavelength may aid in extracting an increased amount of light. Further, the optical interconnect 301 may include an array 306 of the refractive index tuning structures 126C, 126D, 126E, and 126F formed adjacent to the defect cavities 118C, 118D, 118E, and 118F, respectively. The refractive index tuning structures 126C-126F may be example representatives of the refractive index tuning structure 126 described in FIG. 1.

During the operation of the optical device 302, from the light propagating inside the optical waveguide 116, an optical signal having a wavelength equal to a resonant wavelength of the defect cavities 118C-118F may be evanescently coupled into the defect cavities 118C-118F. Further, phase angles of emissions of the first optical signal and the second optical signal may be independently tuned by controlling electrical signals applied to the respective refractive index tuning structures 126C-126F. The application of the electrical signals to the refractive index tuning structures 126C-126F may cause a change in the refractive index of the defect cavities 118C-118F, respectively, which results in a modification of the angle of emission of the light from the defect cavities 118C-118F. FIGS. 4A and 4B illustrate example emission patterns 402 and 404 of light via the defect cavities 118C-118F of the optical device 302 of FIG. 3.

FIG. 4A depicts an example concentric 360-degree emission of light from the defect cavities 118C-118F when all of the defect cavities 118C-118F emit light at the same phase. Wavefronts of lights from each of the defect cavities 118C-118F are shown using dashed circles. Overlap of these wavefronts (e.g., dashed circles) may cause a coherent addition of light, as they are in-phase (e.g., have the same phase). In FIG. 4A, the areas of positive interference are shown by black circles 408A, 408B, 408C, and 408D. As a plurality of emission centers (i.e., the defect cavities 118C-118F) are lined up, a coherent, flat, wavefront 406 (represented via a horizontal line) may appear due to the coherent addition of light. An arrow 410 depicts a direction of emission of the light from the defect cavities 118C-118F caused via the flat wavefront 406.

FIG. 4B depicts another example concentric 360-degree emission of light from the defect cavities 118C-118F when the defect cavities 118C-118F emit light at different phases. As depicted in FIG. 4B, there exists a relative phase difference between the emitted lights as represented by smaller diameters of the dashed circles 412A, 412B, 412C, and 412D which represent the wavefronts. Such differences in the phases of the emitted light may be obtained by controlling electrical signals applied to the refractive index tuning structures 126C-126F. In the configuration of FIG. 4B, the areas of positive interference do not happen in the same horizontal line as shown in FIG. 4A, and thus have a slightly tilted wavefront 414. The wavefront 414 is flat, but albeit tilted at an angle, represented by an arrow 416 at an angle from the normal. Therefore, if one can dynamically control the relative phase difference between the emission centers, the direction of emission for a wavelength of operation (or spectral range) can be steered in a predetermined direction.

Figure 5:
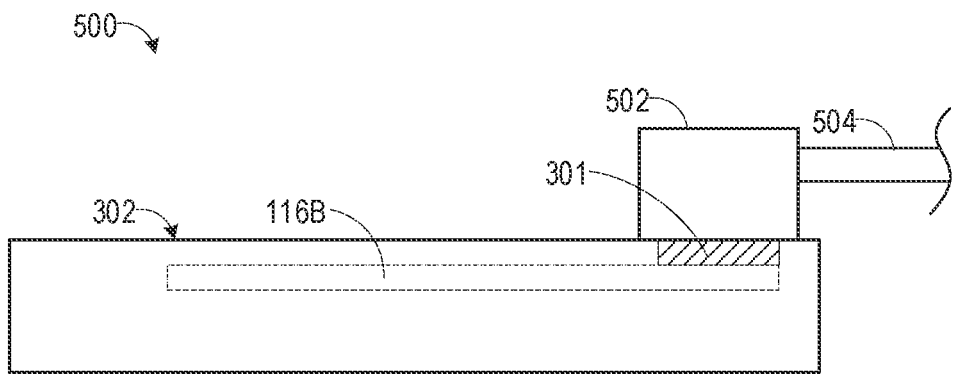
FIG. 5 depicts a block diagram of an example optical system.

Moving now to FIG. 5, a block diagram of an example optical system 500 is depicted. The optical system 500 may include the optical device 302 depicted in FIG. 3 and a detachable optical coupler 502 that can be removably coupled to the optical device 302. As noted earlier, the optical device 302 may include a substrate having a photonic-crystal lattice structure 112, the optical waveguide 116 formed in the photonic-crystal lattice structure 112, and the optical interconnect 301 including the array 304 of defect cavities 118C-118F and the array 306 of refractive index tuning structures 126C-126F (not depicted in FIG. 5). In some examples, the detachable optical coupler 502 may be disposed over the optical interconnect 301. Examples of the optical coupler 502 may include, but are not limited to, a prism coupler, a grating coupler, or an end-fire coupler. The detachable optical coupler 502 may receive light from the optical device 302 via the optical interconnect 301 from the array 304 of defect cavities 118C-118F. Further, the detachable optical coupler 502 may couple the light received from the optical interconnect 301 to a fiber optic cable 504 through which the light can be transmitted to external circuits (not shown).

Figure 6:
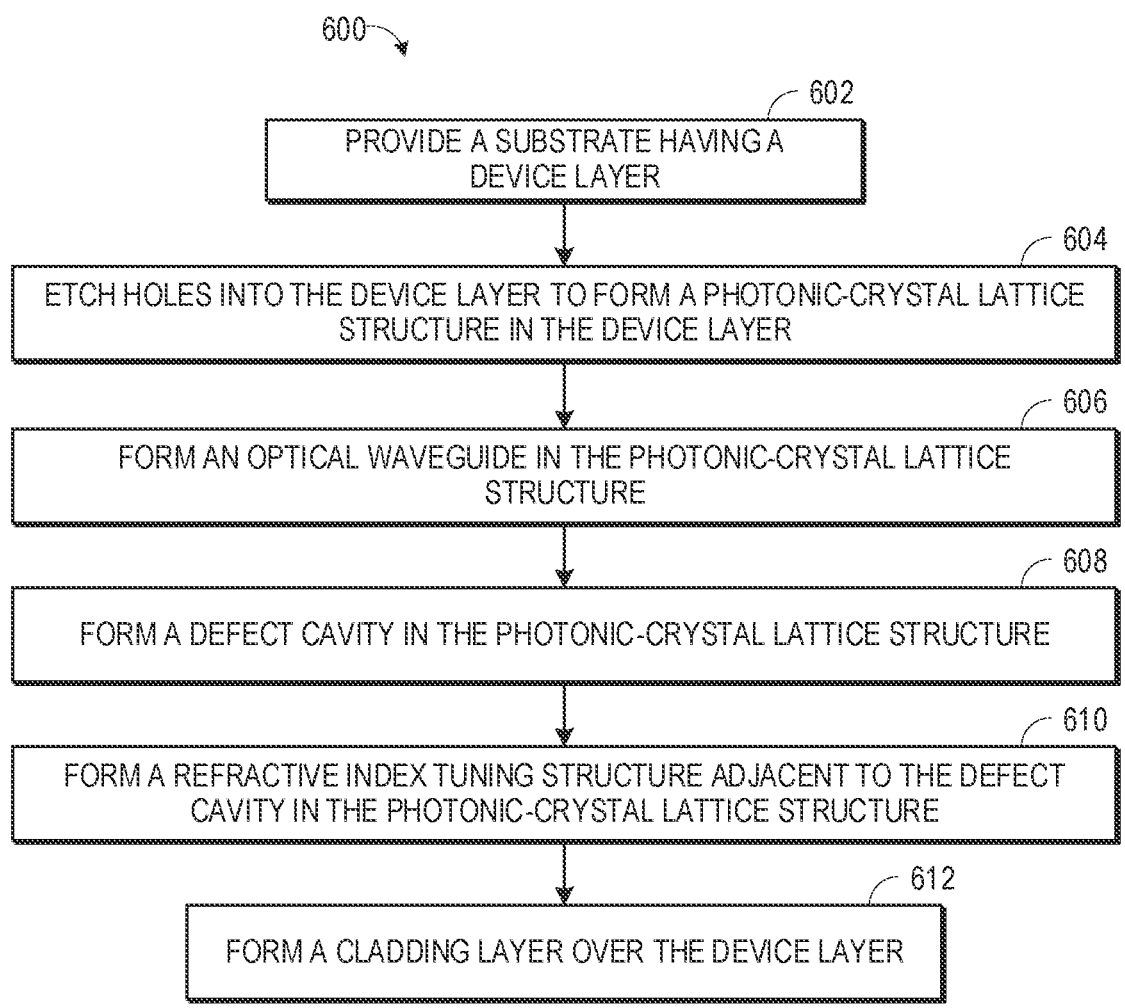
FIG. 6 a flowchart of an example method of forming an optical device.

FIG. 6 depicts a flowchart of an example method 600 of forming an optical device, in accordance with an example. For illustration purposes, the method 600 is described with reference to the optical device 102 of FIGS. 1A-1B. Method blocks of the method 600 may be performed in series, parallel, or a combination thereof. Further, the method blocks may as well be performed in a different order than depicted in the flow diagram of FIG. 6.

At block 602, the method 600 may include providing a substrate, such as, the substrate 104 comprising a device layer 110. Further, at block 604, the method may include etching holes, such as the holes 114, into the device layer at a plurality of lattice sites to form the photonic-crystal lattice structure 112 in the device layer 110. At block 606, the method 600 may include forming an optical waveguide, such as, the optical waveguide 116, in the photonic-crystal lattice structure 112. The optical waveguide 116 may be formed at the time of forming the photonic-crystal lattice structure 112 in the device layer 110, in particular, by avoiding formation of a plurality of holes at a set of serially arranged lattice sites. For example, the region 120 encompassing the set of serially arranged lattice sites may be photolithographically defined and masked. The optical waveguide 116 may be formed by not etching a series of holes in the region 120.

Further, at block 608, the method 600 may include forming a defect cavity, such as the defect cavity 118, in the photonic-crystal lattice structure 112 such that the defect cavity 118 may be optically coupled to the optical waveguide 116. The defect cavity 118 may also be formed at the time of forming the photonic-crystal lattice structure 112 by avoiding formation of a hole at a lattice site in the device layer 110. Moreover, the method 600, at block 610, may include forming a refractive index tuning structure, such as the refractive index tuning structure 126, adjacent to the defect cavity 118 in the photonic-crystal lattice structure 112. To form the refractive index tuning structure 126, a tuning structure region may be photolithographically defined in the device layer 110. The tuning structure region may represent an area on the photonic-crystal lattice structure 112 where the refractive index tuning structure 126 is to be formed. Further, the tuning structure region may be doped with impurities to achieve p-type doping, n-type doping, or both the p-type doping and the n-type doping. The N-type doping or the P-type doping may be achieved by using techniques such as impurity diffusion, ion implantation, in-situ doping, and the like. Moreover, in some examples, at block 612, the method 600 may include forming a cladding layer such as the cladding layer 128 over the device layer 110. The cladding layer 128 may be formed using thermal growth techniques and/or using deposition techniques, such as, chemical vapor deposition (CVD), for example.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method blocks described in various methods may be performed in series, parallel, or a combination thereof. Further, the method blocks may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. An optical device, comprising:
    a substrate comprising a photonic-crystal lattice structure;
    an optical waveguide formed in the photonic-crystal lattice structure;
    an array of defect cavities formed in the photonic-crystal lattice structure and optically coupled to the optical waveguide; and
    an array of refractive index tuning structures, each of the refractive index tuning structures adjacent to a respective defect cavity of the array of defect cavities in the photonic-crystal lattice structure, the array of refractive index structures configured to steer a wavefront of light collectively emitted by the array of defect cavities by locally altering a refractive index of each respective defect cavity.

2. The optical device of claim 1, wherein the photonic-crystal lattice structure comprises a predefined pattern of holes etched into the substrate.

3. The optical device of claim 2, wherein each defect cavity comprises a region of the substrate that does not include the predefined pattern of holes.

4. The optical device of claim 1, wherein each defect cavity and the optical waveguide are orthogonal to each other.

5. The optical device of claim 1, wherein at least one of the refractive index tuning structures comprises a resistive heater, wherein the resistive heater locally heats a respective defect cavity to alter the refractive index of the respective defect cavity.

6. The optical device of claim 1, wherein each refractive index tuning structure comprises p-type doping, n-type doping, or both the p-type doping and the n-type doping.

7. The optical device of claim 1, wherein light having a wavelength equal to a resonant wavelength of the defect cavities of the array of defect cavities is evanescently coupled into the defect cavities of the array of defect cavities from the optical waveguide.

8. An optical system, comprising:
    an optical device comprising:
        a substrate having a photonic-crystal lattice structure;
        an optical waveguide formed in the photonic-crystal lattice structure;
        an optical interconnect comprising:
            an array of defect cavities formed in the photonic-crystal lattice structure and optically coupled to the optical waveguide; and
            an array of refractive index tuning structures, each of the refractive index tuning structures formed adjacent to a respective defect cavity of the array of defect cavities in the photonic-crystal lattice structure; and
    optical interconnect to receive light from the optical device via the optical interconnect,
    wherein the array of refractive index structures is configured to steer a wavefront of light collectively emitted by the array of defect cavities into the detachable optical coupler by locally altering a refractive index of each respective defect cavity.

9. The optical system of claim 8, wherein the photonic-crystal lattice structure comprises a predefined pattern of holes etched into the substrate.

10. The optical system of claim 9, wherein a defect cavity in the array of defect cavities comprises a region of the substrate that does not include the predefined pattern of holes.

11. The optical system of claim 8, wherein a defect cavity in the array of defect cavities is oriented at an angle to a direction of flow of light via the optical waveguide.

12. The optical system of claim 8, wherein a defect cavity in the array of defect cavities and the optical waveguide are orthogonal to each other.

13. The optical system of claim 8, wherein a refractive index tuning structure in the array of refractive index tuning structures comprises a resistive heater, wherein the resistive heater locally heats a respective defect cavity in the array of defect cavities to alter a refractive index of the respective defect cavity to vary an angle of light emitting from the respective defect cavity.

14. The optical system of claim 8, wherein a refractive index tuning structure in the array of refractive index tuning structures comprises p-type doping, n-type doping, or both the p-type doping and the n-type doping.

15. A method, comprising:
    forming an optical waveguide in a photonic-crystal lattice structure;

forming an array of defect cavities in the photonic-crystal lattice structure, wherein the defect cavity is optically coupled to the optical waveguide;

forming an array of refractive index tuning structures, each of the refractive index tuning structures adjacent to a respective defect cavity of the array of defect cavities in the photonic-crystal lattice structure; and steering a wavefront of light collectively emitted by the array of defect cavities by locally altering a refractive index of each respective defect cavity.

16. The method of claim 15, further comprising:
providing a substrate comprising a device layer; and
etching holes at a plurality of lattice sites into the device layer to form the photonic-crystal lattice structure in the device layer.

17. The method of claim 16, wherein forming the optical waveguide comprises avoiding formation of a plurality of holes at a set of serially arranged lattice sites.

18. The method of claim 16, wherein forming the array of defect cavities comprises avoiding formation of a hole at each lattice site of a set of lattice sites in the device layer.

19. The method of claim 16, wherein forming the refractive index tuning structure comprises:
defining tuning structure regions in the device layer; and
doping the tuning structure regions with impurities.

* * * * *